United States Patent
Fukuda et al.

[11] Patent Number: 6,009,721
[45] Date of Patent: Jan. 4, 2000

[54] ABSORPTION REFRIGERATOR

[75] Inventors: Toru Fukuda; Toshimitsu Takaishi; Mitsuru Ishikawa, all of Saitama, Japan

[73] Assignee: Honda Giken Kogyo Kabushiki Kaisha, Tokyo, Japan

[21] Appl. No.: 09/138,748

[22] Filed: Aug. 24, 1998

[30] Foreign Application Priority Data

Apr. 29, 1997 [JP] Japan .................................. 9-250013

[51] Int. Cl.[7] .................................................. F25B 15/00
[52] U.S. Cl. .............................. 62/476; 62/484; 62/485; 62/495; 62/112
[58] Field of Search .......................... 62/476, 484, 112, 62/485, 495

[56] References Cited

U.S. PATENT DOCUMENTS

| | | | |
|---|---|---|---|
| 4,823,864 | 4/1989 | Rockenfeller | 165/104.12 |
| 5,345,786 | 9/1994 | Yoda et al. | 62/476 |
| 5,421,173 | 6/1995 | Lee et al. | 62/485 |
| 5,463,880 | 11/1995 | Nishino et al. | 62/484 |
| 5,490,398 | 2/1996 | Cline | 62/497 |
| 5,787,720 | 8/1998 | Lenz et al. | 62/238.3 |
| 5,787,726 | 8/1998 | Kang | 62/495 |
| 5,806,325 | 9/1998 | Furukawa et al. | 62/103 |

FOREIGN PATENT DOCUMENTS 6-97127  4/1994  Japan .
7-208826  8/1995  Japan .

*Primary Examiner*—Henry Bennett
*Assistant Examiner*—M. Shulman
*Attorney, Agent, or Firm*—Armstrong, Westerman, Hattori, McLeland & Naughton

[57] ABSTRACT

An absorption refrigerator is minimized in the size and the weight. A sensible heat exchanger 14 and a cooling fan 19 for cooling the sensible heat exchanger 14 are mounted front and rear opposite to each other to form a cooling unit. At one side of the fan 19, a regenerator 3 and a rectifier 6 are aligned vertically one over the other. At the other side of the fan 19, an evaporator 1 and an absorber 2 of a rectangular configuration are provided side by side. A condenser 9 is laid above the cooling unit. The cooling unit, the evaporator 1, the absorber 2, the condenser 9, the regenerator 3, the rectifier 6, and a set of pumps P1 to P4 all are installed in a main housing 20 of substantially a rectangular parallelopiped shape having a depth reduced axially of the cooling fan 19.

7 Claims, 4 Drawing Sheets

ABSORPTION REFRIGERATOR

BACKGROUND OF THE INVENTION

1. Field of the Invention

The present invention relates to an absorption refrigerator (including of a thermodynamic heating type airconditioner) and particularly, to an absorption refrigerator which is decreased in overall size by adopting an improved layout of components.

2. Description of the Related Art

Absorption refrigerators are used as cooling systems operated in absorption cooling cycles and their advantage has significantly been focused that the efficiency of energy transfer in operation is high. More specifically, thermodynamic heating type of absorption refrigerator, which can provide a heating operation with an evaporator pumping up heat from the outside air in addition to the cooling operation, is now widely demanded.

For example, such an absorption type air-conditioner is disclosed in Japanese Patent Laid-open Publication No. Hei 6-97127 in which operable are three different modes: a cooling operation, a heating operation of a thermodynamic heating, and a direct flame heating operation (e.g. using a boiler).

Conventional absorption refrigerators are substantially bulky in size and thus unfavorable for use as household appliances. One of undersized modifications of the absorption refrigerator is disclosed as an airconditioner in Japanese Patent Laid-open Publication No. Hei 7-208826. The size of the airconditioner is decreased by adopting an improved joint arrangement between the evaporator and the absorber. The joint arrangement in said airconditioner is not significant but has an absorption tube of the absorber bent in a shape. Since the basic layout of its components remain unchanged as a whole, the airconditioner fails to be modified to a smaller size suited, for example, for home use.

SUMMARY OF THE INVENTION

It is an object of the present invention to provide an absorption refrigerator which has its components arranged in a highly integrated layout in a simple form of housing hence minimizing its overall dimensions.

In the first feature of the present invention, the evaporator comprising a first heat exchanging core including a plurality of long and vertical fins arranged with intervals between them, a refrigerant spraying means provided above the first heat exchanging core for spraying the refrigerant over surfaces of the fins, and an evaporator housing in which the first heat exchanging core and the refrigerant spraying means are installed, said absorber comprising a second heat exchanging core including a plurality of long and vertical fins arranged with intervals between them, an absorbent solution spraying means provided above the second heat exchanging core for spraying the absorbent solution over surfaces of the fins, and an absorber housing in which the second heat exchanging core and the absorbent solution spraying means are installed, said sensible heat exchanger and said cooling fan being disposed front and rear opposite to each other in a cooling unit, and said evaporator and said absorber being disposed with their fins extending along a lengthwise direction and substantially vertical to the base plane of the main housing and arranged side by side in one side of the cooling unit.

According to the first feature of the present invention, the evaporator and the absorber are long and arranged on one side of the cooling unit with their longitudinal sides being vertical hence permitting their cores for heat exchange to be decreased in size of the projection area on the base plane.

In the second feature of the present invention, the regenerator and the rectifier are disposed opposite to the evaporator and the absorber about the cooling unit, the regenerator located below the rectifier, and the condenser is arranged horizontally above the cooling unit, and the main housing is formed of substantially a rectangular parallelopiped shape having a depth reduced along the axis of the cooling fan.

According to the second feature of the present invention, the evaporator and the absorber are disposed on an opposite side of the regenerator and the rectifier about the cooling unit. This allows the components to be installed in the main housing at compact without dead spaces.

DETAILED DESCRIPTION OF THE PREFERRED EMBODIMENT

Figure 5:
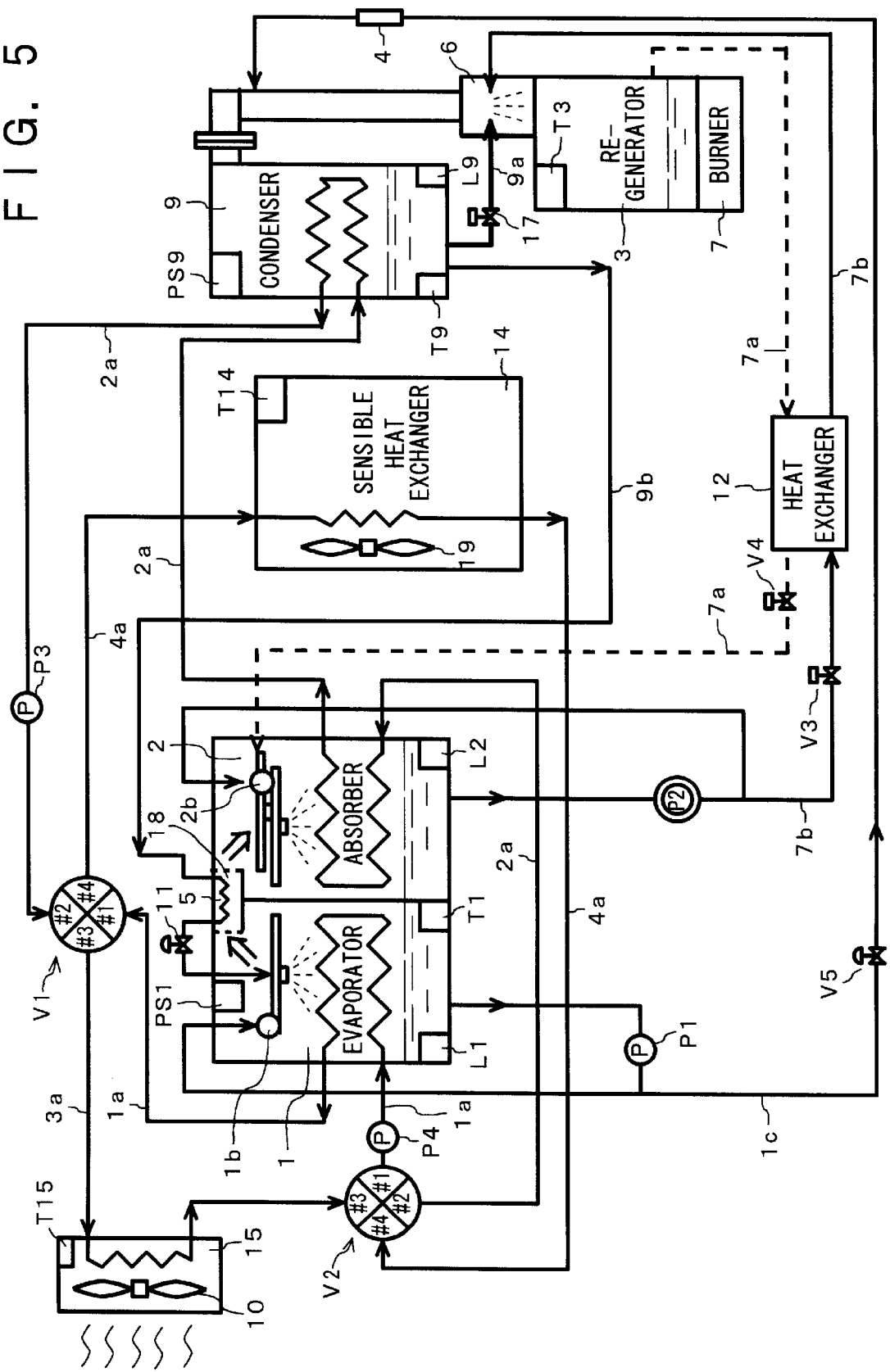
FIG. 5 is a circuitry diagram of the absorption refrigerating and heating apparatus of the embodiment.

The present invention will be described in detail referring to the accompanying drawings. FIG. 5 is a schematic block view of a primary part of the absorption refrigerator showing an embodiment of the present invention. The absorption cooling/heating apparatus described below is regarded as an example of an absorption refrigerator.

An evaporator 1 is filled with a refrigerant of fluoride alcohol such as trifluoroethanol (TFE), while an absorber 2 is filled with a solution of DMI derivative such as dimethylimidazolidinon which contains an absorbent. The refrigerant is not limited to fluoride alcohol but may be an appropriate agent of which nonfreezing range is wide. The solution also is not limited to the DMI derivative and it may be any other absorbent solution which is wide in the nonfreezing range, being higher than TFE in the atmospheric temperature boiling point and having an enough power to absorb TFE. For example, a combination of water and lithium bromide is unfavorable as the solution in the present embodiment, since water as a refrigerant may be frozen by temperature drop of the solution during the operation of the heating mode with the outside air temperature being about zero degree.

The evaporator 1 and the absorber 2 are fluidically communicated with each other by a (refrigerant) vapor passage 5. When inside spaces of the evaporator 1 and the absorber 2 are kept under a low pressure condition, for example, at 30 mmHg, the refrigerant is evaporated in the evaporator 1 and transferred via the passage to the absorber 2. A pre-cooler 18 may be mounted across the vapor passage. In the pre-cooler 18, a mist of the refrigerant which remains in the refrigerant vapor is heated for evaporation as well as the temperature of TFE fed back from the condenser 9 is lowered. The refrigerant vapor is absorbed by the absorbent solution in the absorber 2 thus generating an absorption refrigerating action.

When a burner 7 is lit to heat up a regenerator 3 for increasing the concentration of the absorbent solution in the absorber 2, the absorbent absorbs the refrigerant vapor in the absorber 2 and the evaporation of the refrigerant in the evaporator 1 is accelerated hence cooling down the interior of the evaporator 1 with the latent heat of the refrigerant evaporation. The burner, the regenerator, and the concentration of the absorbent solution will be described later in more detail. A tube 1a for passing a chilled water is mounted to run through the evaporator 1. The tube 1a is connected at one end (the exit side in the embodiment shown) to the No. 1 opening of a first four-way valve V1 and at the other end (the entrance side in the embodiment) to the No. 1 opening of a second four-way valve V2.

The refrigerant is fed by the action of a pump P1 to a spraying means 1b mounted in the evaporator 1 for being sprayed over the tube 1a in which the chilled water runs. The refrigerant deprives the chilled water in the tube 1a of heat and turns to a vapor which passes via the vapor passage 5 into the absorber 2. Consequently, the temperature of the chilled water is more declined. The refrigerant in the evaporator 1 is not only fed to the spraying means 1b, but a small part of it is supplied via a filter 4 to a rectifier 6, which will be explained later. A flow valve V5 is mounted between the evaporator 1 and the filter 4. The chilled water running in the tube 1a may preferably be either an ethylene glycol or propylene glycol water solution.

As the refrigerant vapor or a vapor of fluoride alcohol is absorbed by the solution in the absorber 2, the absorption heat increases the temperature of the solution. The lower the temperature and the higher the concentration of the solution, the greater the absorbing capability of the solution will be. For attenuating the temperature increase of the solution, a tube 2a is provided in the absorber 2 for passing a flow of cooling water. The tube 2a is connected at one end (the exit side in the embodiment shown) via a condenser 9 and a pump P3 to the No. 2 opening of the first four-way valve V1 and at the other end (the entrance side) to the No. 2 opening of the second four-way valve V2. Preferably, the cooling water running along the tube 2a is the same as the chilled water in properties or constitution.

The absorbent solution is fed by the action of the pump P2 to a spraying means 2b mounted in the absorber 2 for being sprayed over the tube 2a. Consequently, the solution is cooled down by the cooling water running along the tube 2a. Simultaneously, the cooling water deprives the solution of heat and its temperature will increase. As the solution in the absorber 2 has absorbed the refrigerant vapor, the concentration of the absorbent drops thus lowering the absorbing capability of the solution.

The diluted solution which has absorbed the refrigerant vapor in the absorber 2 is passed via a tube 7b and a control valve V3 to the rectifier 6 and the regenerator 3 as well as fed to the spraying means 2b by the pump P2. The regenerator 3 is provided with the burner 7 for heating up the diluted solution. The burner 7 may be a gas burner or any other heating means. The solution is heated in the regenerator 3 and the concentration of the absorbent is increased as the refrigerant vapor is separated. The resultant (concentrated) solution is returned via a tube 7a and a control valve V4 to the absorber 2 where it is sprayed over the tube 2a by the spraying means 2c.

When the diluted solution fed to the regenerator 3 is heated with the burner 7, it releases a refrigerant vapor. As the absorbent mixed in the refrigerant vapor has been removed in the rectifier 6, the refrigerant vapor of a higher purity is supplied to the condenser 9 where it is cooled down to be liquidized. Then, a resultant liquid form of the refrigerant is returned via the tube 9b, the pre-cooler 18, and the pressure reducing valve 11 to the evaporator 1 where it is sprayed over the tube 1a.

Although the purity of the refrigerant fed back from the condenser 9 is fairly high in the evaporator 1, it may or must gradually be declined because a vary small amount of the absorbent intermixed in the circulated vapor is accumulated during a long period of the cycle operation. For recovering the purity of the refrigerant, as mentioned above, a small portion of the refrigerant from the evaporator 1 is preferably sent through the valve 5 and the filter 4 to the rectifier 6 where it is mixed with the refrigerant vapor from the regenerator 3.

A heat exchanger 12 is provided in the middle way of the tubes 7a and 7b which respectively connect the absorber 2 and the rectifier 6. The absorbent solution at high concentration and high temperature which runs along the tube 7a from the regenerator 3 is subjected to a heat exchanging action of the heat exchanger 12 with the diluted solution which runs along the tube 7b from the absorber 2, hence being cooled before it is fed to the absorber 2 where it is sprayed. In reverse, the diluted solution is preheated by the action of the heat exchanger 12 and passed to the rectifier 6. This will surely improve the thermal efficiency in the apparatus. In addition, another heat exchanger (not shown) may be provided for transferring heat from the concentrated solution to the cooling water which runs along the tube 2a from the absorber 2 or the condenser 9. Accordingly, the temperature of the concentrated solution returned to the absorber 2 will be reduced further while the temperature of the cooling water will be more increased.

A sensible heat exchanger 14 is also provided with a tube 4a for heat exchange between the cooling water or the chilled water and the outside air and an indoor unit 15 is provided with a tube 3a. The tubes 3a and 4a are connected at one end (the entrance side in the embodiment shown) to the No. 3 and No. 4 openings of the first four-way valve V1 respectively and at the other end (the exit side) to the No. 3 and No. 4 openings of the second four-way valve V2, respectively. The indoor unit 15 is located in a room to be airconditioned and includes a fan 10 used in common for blowing out either cooling air and heating air from its blowing window (not shown). The sensible heat exchanger 14 is normally placed in the outdoor and includes a fun 19 for forcedly exchanging of heat with the outside air.

The evaporator 1 is accompanied with a level sensor L1 for detecting the amount of the refrigerant, a thermal sensor T1 for measuring the temperature of the refrigerant, and a pressure sensor PS1 for detecting the pressure in the evaporator 1. The absorber 2 is equipped with a level sensor L2 for detecting the amount of the solution. The condenser 9 is provided with a level sensor L9 for detecting the amount of a condensed refrigerant, a thermal sensor T9 for measuring the temperature of the refrigerant, and a pressure sensor PS9 for detecting the pressure in the condenser 9. The sensitive heat exchanger 14, the regenerator 3, and the indoor unit 15 are equipped with thermal sensors T14, T3, and T15, respectively. The thermal sensor T14 of the sensitive heat exchanger 14 measures the temperature of outside air while the thermal sensor T15 of the indoor unit 15 detects the temperature in a room to be airconditioned. The thermal sensor T3 of the regenerator 3 detects the temperature of the absorbent solution.

In the cooling operation of the above arrangement, the first and the second four-way valves and V1 V2 are switched to connect between the No. 1 and No. 3 openings and between the No. 2 and No. 4 openings, respectively. Accordingly, the chilled water which has been cooled down with spraying of the refrigerant over the tube 1a, is conveyed to the tube 3a in the indoor unit 15 for cooling the room.

In operation of the heating mode, the first and the second four-way valves V1 and V2 are actuated so that the No. 1 and No. 4 openings are communicated to each other and the No. 2 and No. 3 openings are communicated to each other. Accordingly, the cooling water heated in the tube 2a is passed to the tube 3a in the indoor unit 15 for heating up the room.

When the outside air temperature extremely drops, the sensible heat exchanger 14 hardly pumps up heat from the outside air thus lowering the heating capability. Preparing for such condition, there is provided with a bypass passage with a switching valve 17 between the condenser 9 and regenerator 3 (or rectifier 6). With such a very low temperature at the outside, the thermodynamic heating is halted and the refrigerant vapor generated in the regenerator 3 is circulated back from the condenser 9 to the regenerator 3 to enable the direct flame heating mode in which heat produced by the burner 7 is transferred with high efficiency to the cooling water which runs through the tube 2a in the condenser 9, thus contributing to raising the temperature of the cooling water and the increase of the heating capability in the apparatus.

The layout of the components in the refrigerating and heating apparatus is explained. For widely use of the refrigerating and heating apparatus at home, the major components including the evaporator 1, the absorber 2, and the regenerator 3 are desired to be installed at a higher integrated relationship in the housing as well as in a desired layout suited for accomplishing their functions. It has been proved that the layout in the present embodiment contributes the size reduction of the apparatus for practical use as will be explained below in more detail.

Figure 1:
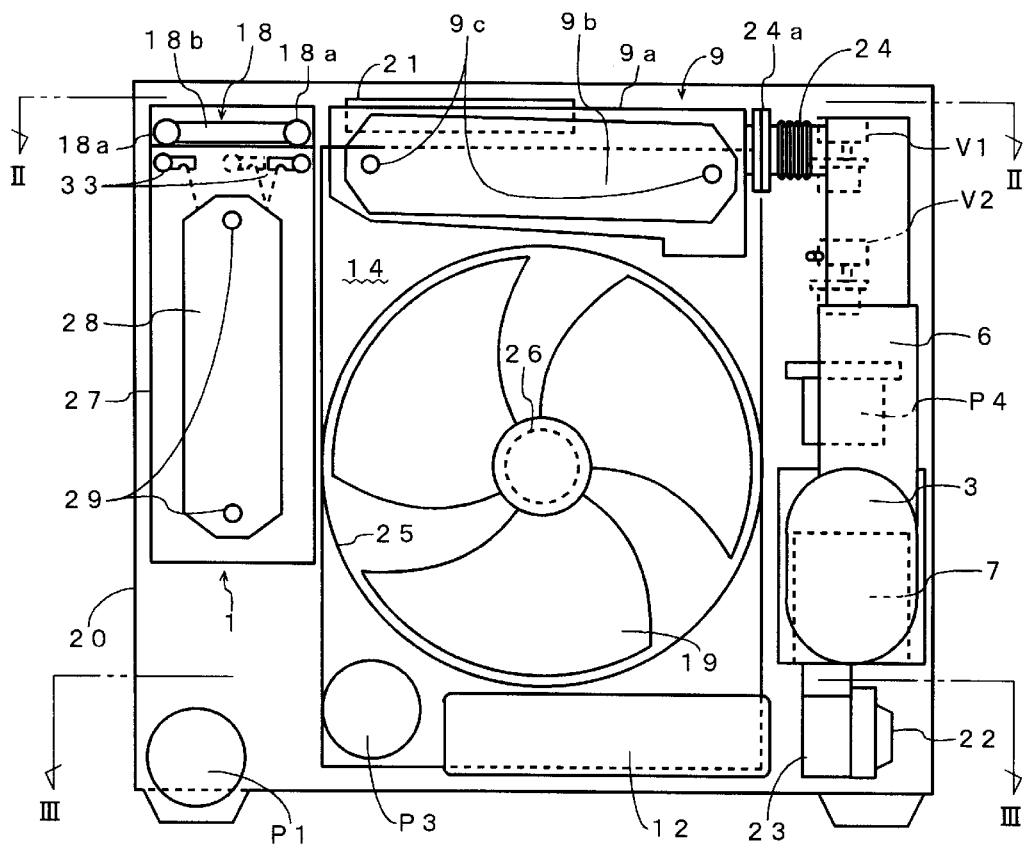
FIG. 1 is a front view showing a layout of components in an absorption refrigerating and heating apparatus according to an embodiment of the present invention.
Figure 2:
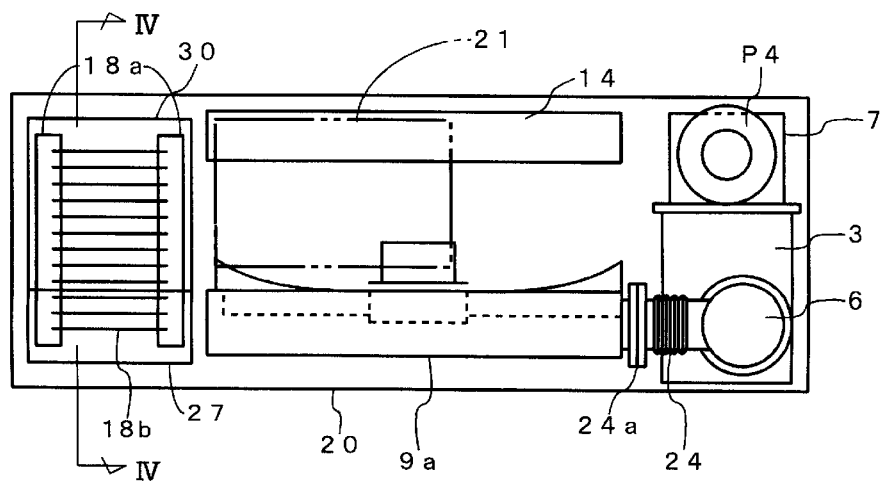
FIG. 2 is a (first) cross sectional plan view taken along the line II—II of FIG. 1 showing the layout of components in the absorption refrigerating and heating apparatus of the embodiment.
Figure 3:
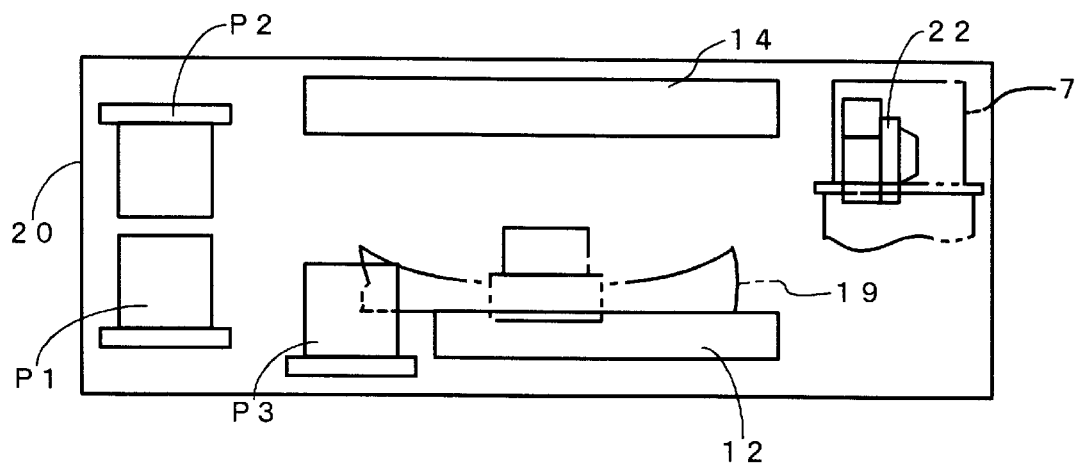
FIG. 3 is a (second) cross sectional plan view taken along the line III—III of FIG. 1 showing the layout of components in the absorption refrigerating and heating apparatus of the embodiment.
Figure 4:
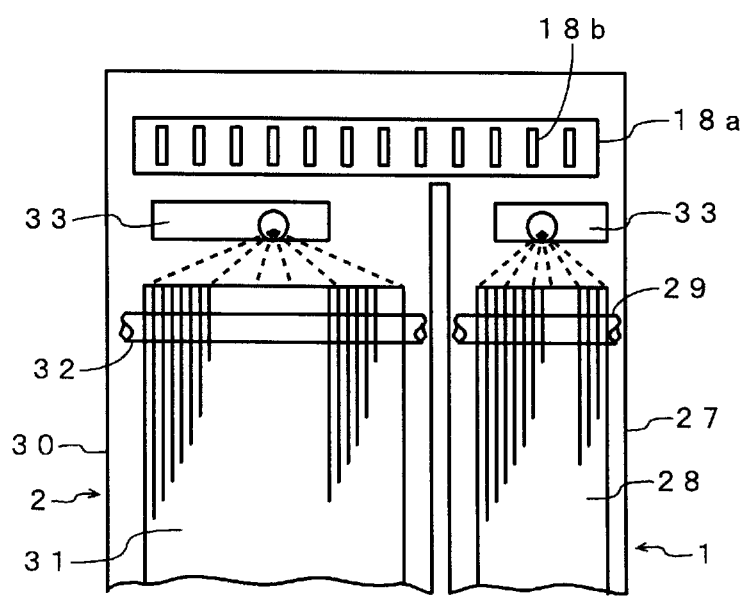
FIG. 4 is a cross sectional view taken along the line IV—IV of FIG. 1 showing the layout of components in the absorption refrigerating and heating apparatus of the embodiment.

FIG. 1 is a front view of the major components in the layout of the refrigerating and heating apparatus of the embodiment according to the present invention. FIG. 2 is a cross sectional plan view taken along the line II—II of FIG. 1. FIG. 3 is a cross sectional plan view taken along the line III—III of FIG. 1, showing a group of the components located on the bottom side of the housing. FIG. 4 is a cross sectional view taken along the line IV—IV of FIG. 2 showing the evaporator 1 and the absorber 2.

Throughout the drawings, identical or like components are denoted by like numerals as those of FIG. 5. In FIGS. 1 to 4, only the major components are illustrated while their relevant pipings and supports for anchoring them to the housing are implemented by known means and not shown for simplifying the description.

As shown in FIGS. 1 to 4, a housing denoted by outline 20 is a rectangular box-like shape in which the major components are accommodated as described below. For ease of the description, a bottom side 20A or the lowermost of the housing 20 is designated as a base and the plane on which the base is located is termed a base plane. The regenerator 3 is mounted at the right front portion (or right lower portion in FIG. 2) in the housing 20 and the rectifier 6 is situated thereon and integrated with the regenerator 3. More specifically, the regenerator 3 and the rectifier 6 are aligned vertically or stacked with each other. As best shown in FIG. 2, the burner (a combustion chamber) 7 is mounted behind the regenerator 3Provided below the burner 7 is a blower 22 for feeding a flow of fuel gas to the burner 7 and a flow controller 23 for controlling the flow of fuel gas. The heat exchanger 12 extending horizontally is disposed on the inner or center side of the flow controller 23 (FIG. 1).

A connecting tube 24 extends horizontally from the top of the rectifier 6 and is joined by a flange 24a to the condenser 9 arranged opposite thereto. The condenser 9 comprises an enclosure (housing) 9a and a row of fins 9b mounted in the enclosure 9a. The fins 9b are aligned depthwisely of the refrigerating and heating apparatus or the housing 20 thus forming a core. A pipe 9c which is a portion of the tube 2a extends through the fins 9b. Since the rectifier 6 and the condenser 9 are located next to each other, they are joined by a duct or tube 24 which is minimized in length hence allowing the refrigerant from the rectifier 6 to be readily received by the condenser 9 and contributing to the reduction of the size of the refrigerating and heating apparatus. A control unit 21 is provided adjacent to the condenser 9 in an upper region of the housing 20.

The sensible heat exchanger 14 is located in a center back region of the housing 20 (at the upper portion in FIGS. 2 and 3) and a cooling fan 19 is provided in the front of the sensible heat exchanger 14 for giving a blow of air against the sensible heat exchanger 14. The fan 19 is accommodated in an air duct of which inner wall is denoted by outline 25 and driven by a motor 26. The pump P3 is located beneath the air duct 25 and on the base 20A adjacent to the heat exchanger 12. The pump P4 and the four-way valves V1 and V2 are situated in a space provided behind the rectifier 6 and above the burner 7.

The evaporator 1 and the absorber 2 are arranged front and back next to each other (FIG. 4) in the left corner of the housing 20 and opposite to the regenerator 3 and the rectifier 6 about the sensible heat exchanger 14 and the cooling fan 19 as shown in FIG. 1. The evaporator 1 comprises an evaporator housing 27 and a first heat exchanging core or evaporator core consisting mainly of a multiplicity of fins 28 aligned along their depthwise direction and accommodated in the evaporator housing 27. A pipe 29 which is a part of the conduit 1a extends through the fins 28.

As best shown in FIGS. 2 and 4, the absorber 2 comprises an absorber housing 30 and a second heat exchanging core or absorber core consisting mainly of a multiplicity of fins 31 aligned along their depthwise direction and accommodated in the absorber housing 30. A pipe 32 which is a part of the conduit 2a and is heat-conductively connected with the fins 31 extends through the absorber 2. The fins 28 and 31 are made of heat-conductive material strips such as metal having almost rectangular shape and disposed with their lengthwise sides vertical to the base 20A.

The evaporator 1 and the absorber 2 are fluidly joined at the uppermost to each other by a refrigerant passage 5 and substantially arranged integral with each other. The refrigerant passage 5 allows the refrigerant vapor produced in the evaporator 1 to be transferred to the absorber 2. The evaporator 1 and the absorber 2 are located adjacent to the condenser 9 hence reducing the length of the conduits for conveying the refrigerant and the cooling water.

The pump P1 is located beneath the evaporator 1 and on the base 20A side and the pump P2 beneath the absorber 2. The three pumps P1 to P3 in a lower region of the housing 20 are adapted for having a difference of the level between the supply side and the receive side of the refrigerant and the cooling water so as to increase the liquid head. Accordingly, the pumping actions for delivery of them is enhanced and the pumps can be minimized in size and weight.

Spraying means or flat sprays 33 are respectively provided over the fins 28 and 31 for giving fan-shaped sprays of the refrigerant and the absorbent solution as shown with the dotted lines in FIG. 4. The preheater 18 is located over the pair of the flat sprays 33 and bridged over the evaporator 1 and the absorber 2. The preheater 18 comprises a pipe 18a in which the refrigerant runs from the condenser 9 to the evaporator 1 and a multiplicity of fins 18b mounted on the pipe 18a.

The long strips of fins 28 and 31 of the evaporator 1 and the absorber 2 extend vertically, respectively, and thus, the top view area of the cores, that is, the projection area of the cores on the base plane 20A is small. It means that the installation space on the base plane 20A for the evaporator 1 and the absorber 2 is decreased, and less number of sprays 33 can distribute the spray of liquids to the entire surfaces of the fins 28 and 31 with much ease.

The less the number of the flat sprays 33, the smaller the pumping capability of the pumps P1 and P2 is allowed. Accordingly, the size of the pumps P1 and P2 and the space for installation of the flat sprays 33 can be decreased, thus contributing to the smaller dimensions or volumes of the evaporator 1 and the absorber 2.

The flat sprays 33 are designed for distributing sprays of the refrigerant and the absorbent solution throughout the surface of the fins 28 and 31, respectively, as shown with the dotted lines in FIG. 4. In addition, the location and spraying angle θ of the flat sprays 33 may be carefully determined so that drops of the sprayed liquid diagonally fall down from the top edges of the fins 28 and 31 as shown in FIG. 6.

Figure 6A:
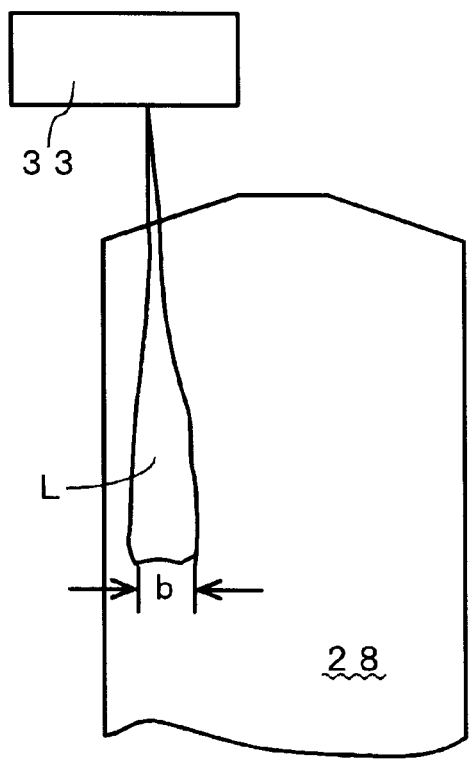
FIG. 6 is an enlarged conceptive diagram showing flows of a liquid refrigerant.
Figure 6B:
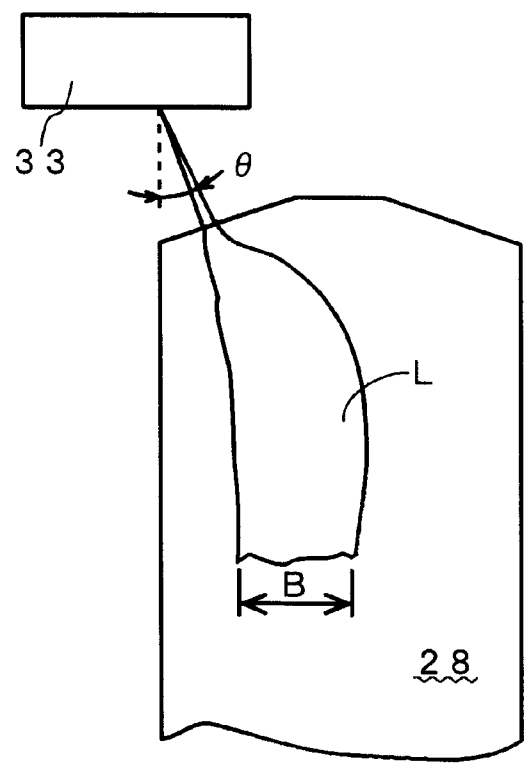

The advantages of diagonally spraying of the refrigerant and the absorbent solution from the top is now explained referring to FIG. 6. FIG. 6A illustrates the dripping of the refrigerant sprayed vertically and downwardly and FIG. 6B shows the dripping of the refrigerant sprayed diagonally from above. As apparent, the dripping of the liquid L of the vertical spray falls down over the fin 28 with a smaller width b. As a flow of the liquid L of the diagonal spray falls down with the angle θ over the fin 28, its width B is greater than the width b. Accordingly, the diagonal spray of the refrigerant and the absorbent solution will increase in the spraying area on the fin thus allowing a less number of the flat sprays 33 to produce efficiently distribution of the liquid over the fin.

The spraying angle θ is not limited to adopt to both the flat sprays 33 in the evaporator 1 and the absorber 2 but may be adopted to either the evaporator 1 or the absorber 2.

According to the present invention, the evaporator and the absorber are long, vertically installed and located in one side of the cooling section of the apparatus so that their projection area on the base is decreased. This allows a less number of the refrigerant and absorbent solution spraying means to efficiently distribute the refrigerant and the absorbent solution over the fins of the evaporator and the absorbers with a higher contact area.

The evaporator and the absorber are disposed on the opposite side of the air-cooling section in relation to the regenerator and the rectifier, hence contributing to the compact installation of the components in the housing without making dead spaces. Consequently, the installation space for the apparatus will be decreased and its positional limitation will be minimized.

The refrigerant is not limited to trifluoroethanol used in the present embodiment but other known applicable agents may be used as the refrigerant with equal success in the apparatus of the present invention in which the layout of its components described in the embodiment remains unchanged. When the refrigerant is trifluoroethanol, the major heat exchange components including the evaporator 1, the absorber 2, and the condenser 9 are preferably made of an aluminum or its alloy. It is understood that trifluoroethanol is less corrosive to aluminum and its alloy. When the major components are made of the aluminum or its alloy, the overall weight of the absorption refrigerating and heating apparatus will significantly be decreased. Also, the mechanical stability of the apparatus is not blemished by the evaporator 1, the absorber 2, and the condenser 9 located in an upper region of the housing 20 because the gravity center of the apparatus is substantially low.

If lithium bromide which is highly corrosive to aluminum and its alloy is used as the refrigerant in the apparatus of the present invention, the evaporator 1, the absorber 2, and the condenser 9 may preferably be made of copper or its alloy. In this case, the gravity center of the apparatus is lifted up and proper reinforcements for supporting the apparatus will be needed for stable installation.

What is claimed is:

1. An absorption refrigerator comprising the following elements:

an evaporator, an absorber for containing an absorbent solution to absorb a refrigerant vapor produced in the evaporator, a regenerator for heating up the absorbent solution to extract the refrigerant vapor and thus recover the concentration of an absorbent in the absorbent solution, a condenser for condensing the refrigerant vapor extracted in the regenerator and delivering it to the evaporator, a sensible heat exchanger for exchanging heat with the outside air, and cooling fan for cooling the sensible heat exchanger, wherein all of said elements are installed in a main housing having a base plane, said evaporator comprising
a first heat exchanging core including a plurality of long and vertical fins arranged with intervals between them,
a refrigerant spraying means provided above the first heat exchanging core for spraying the refrigerant over surfaces of the fins, and
an evaporator housing in which the first heat exchanging core and the refrigerant spraying means are installed, said absorber comprising
a second heat exchanging core including a plurality of long and vertical fins arranged with intervals between them,
an absorbent solution spraying means provided above the second heat exchanging core for spraying the absorbent solution over surfaces of the fins, and
an absorber housing in which the second heat exchanging core and the absorbent solution spraying means are installed, said sensible heat exchanger and said cooling fan being disposed front and rear opposite to each other in a cooling unit, and said evaporator and said absorber being disposed with their fins extending along a lengthwise direction and substantially vertical to the base plane of the main housing and arranged side by side in one side of the cooling unit.

2. An absorption refrigerator according to claim 1, wherein at least one of the refrigerant spraying means and the absorbent solution spraying means has a particular spraying angle for spraying at least one of the refrigerant and the absorbent solution diagonally from above over surfaces of the fins of its corresponding heat exchanging core.

3. An absorption refrigerator according to claim 1, further comprising a rectifier for enriching the refrigerant vapor extracted in the regenerator and wherein the regenerator and the rectifier are disposed opposite to the evaporator and the absorber about the cooling unit, the regenerator located below the rectifier, and the condenser is arranged horizontally above the cooling unit, and the main housing is formed of substantially a rectangular parallelopiped shape having a depth reduced along the axis of the cooling fan.

4. An absorption refrigerator according to claim 2, further comprising a rectifier for enriching the refrigerant vapor extracted in the regenerator and wherein the regenerator and the rectifier are disposed opposite to the evaporator and the absorber about the cooling unit, the regenerator located below the rectifier, and the condenser is arranged horizontally above the cooling unit, and the main housing is formed of substantially a rectangular parallelopiped shape having a depth reduced along the axis of the cooling fan.

5. An absorption refrigerator comprising:

a cooling unit in which a sensible heat exchanger for exchanging heat with the outside air and a cooling fan for cooling the sensible heat exchanger are installed front and rear opposite to each other;

a regenerator provided in one side of and adjacent to the cooling unit;

a rectifier disposed on the regenerator;

a condenser provided above the cooling unit for fluid communication with the rectifier at its upper portion;

a long and vertical evaporator provided on the other side of and adjacent to the cooling unit;

a long and vertical absorber provided on the other side of and adjacent to the cooling unit and aligned closely with the evaporator in an axial direction of the cooling fan for fluid communication with the evaporator at their upper portions; and a main housing of substantially a rectangular parallelopiped shape in which the foregoing components are installed.

6. An absorption refrigerator according to claim 1, wherein the refrigerant is trifluoroethanol.

7. An absorption refrigerator according to claim 1, wherein at least one of the evaporator, the absorber, the regenerator, and the condenser is made of aluminum alloy.

* * * * *

UNITED STATES PATENT AND TRADEMARK OFFICE
CERTIFICATE OF CORRECTION

PATENT NO.   : 6,009,721
DATED        : January 4, 2000
INVENTOR(S)  : Fukuda, et. al.

It is certified that error appears in the above-identified patent and that said Letters Patent is hereby corrected as shown below:

Title page, item [30], change the date of the foreign priority, "April 29, 1997" to --August 29, 1997"--.

Signed and Sealed this

Twenty-second Day of August, 2000

Attest:

Q. TODD DICKINSON

*Attesting Officer*     *Director of Patents and Trademarks*